(No Model.)
C. J. LENNIHAN.
PLUMBER'S TRAP.
No. 539,775. Patented May 21, 1895.
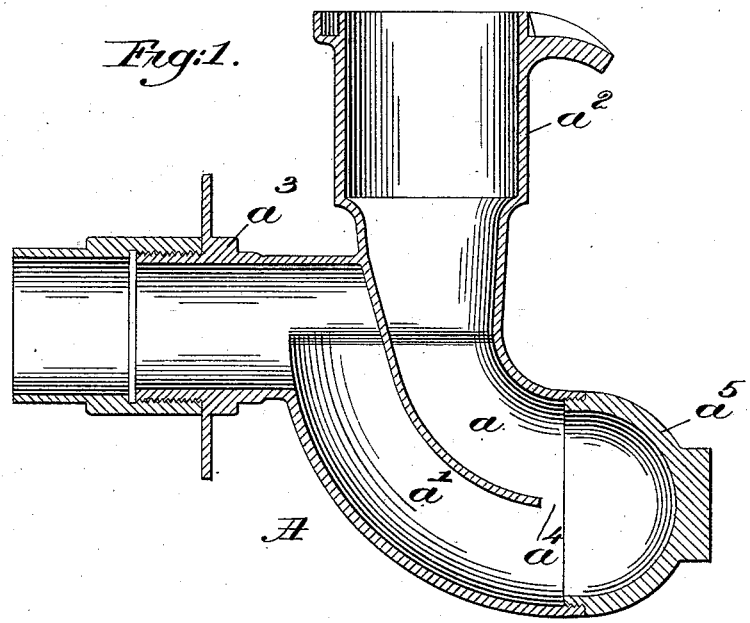
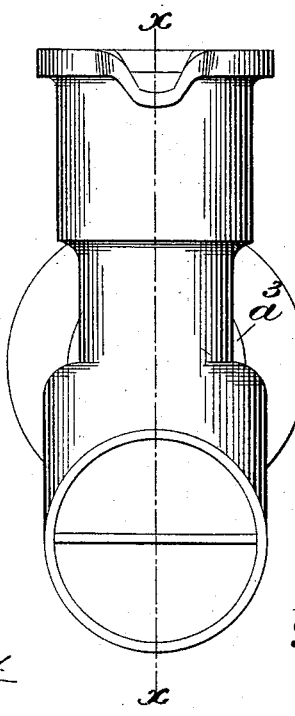

UNITED STATES PATENT OFFICE.

CHARLES J. LENNIHAN, OF BOSTON, MASSACHUSETTS, ASSIGNOR TO HENRY HUSSEY & CO., OF SAME PLACE.

PLUMBER'S TRAP.

SPECIFICATION forming part of Letters Patent No. 539,775, dated May 21, 1895.

Application filed February 11, 1895. Serial No. 537,903. (No model.)

*To all whom it may concern:*

Be it known that I, CHARLES J. LENNIHAN, of Boston, county of Suffolk, State of Massachusetts, have invented an Improvement in Plumbers' Traps, of which the following description, in connection with the accompanying drawings, is a specification, like letters on the drawings representing like parts.

This invention has for its object to provide an improved plumber's trap particularly designed for use in connection with urinals and wash bowls. Traps for this purpose have heretofore been provided at their bottoms with clean-out openings fitted with suitable closures, but clean-out openings, so located, are extremely difficult of access, principally because of the necessary close proximity of the trap to the floor. To obviate this objection, I have, in accordance with my invention, devised a trap having a curved body, the curve preferably extending through substantially ninety degrees, and containing two curved passages. Two necks at one end of the curved body and standing at substantially right angles to each other connect with the respective passages; and at the opposite end of the curved body, a closure is applied, which, when removed uncovers the ends of both curved passages. When this trap is in use, the neck which constitutes the trap inlet, stands in a nearly vertical position, and the neck which constitutes the trap outlet stands at right angles thereto, or in a substantially horizontal position, the lower ends of the curved passages being also substantially horizontal so that when the closure is removed, the ends of both passages face the workman who is therefore enabled to readily remove any obstruction.

In the drawings, Figure 1 is a vertical section of a trap embodying my invention; and Fig. 2, a right-hand end view with the closure removed to expose the lower ends of the curved passages, as when the trap is in use.

In the particular embodiment of my invention selected for illustration and shown in the drawings, A, is a curved body, shown as having a curve of substantially ninety degrees, it containing two curved passages $a$, $a'$.

The curved body A, at one, its upper end, is provided with two necks $a^2$, $a^3$, standing at right angles to each other, one, shown as $a^2$, communicating with the passage $a$; the other with the passage $a'$, said passages at their ends, opposite the said necks, $i.$ $e.$, at their lower ends, communicating with each other through an opening, shown as formed partly in the partitions separating the passages, at $a^4$, and partly in or through the hollowing or cup-shaped closure or cap $a^5$ applied, preferably by a screw thread, to the lower end of the curved body, opposite the necks referred to.

The trap when in use, usually stands in the position shown in Fig. 1, the neck $a^2$ and passage $a$ constituting the inlet passage, and the neck $a^3$ and passage $a'$ constituting the outlet or discharge passage.

A water seal is at all times formed in the passages to the level of the outlet neck $a^3$.

By removal of the closure $a^5$, which stands at the side of the trap body, the open lower ends of both passages constituting clean-out openings are at once exposed, or uncovered rendering it easy of examination or for cleaning.

This trap may be placed quite close to the floor, and be perfectly easy of access for cleaning.

My invention is not limited to the exact construction or curving shown, as the same may be varied without departing from the spirit and scope of my invention, and while my invention is particularly adapted for urinal traps it is not limited to such use alone.

I claim—

1. The herein described trap containing a substantially vertical inlet passage having its lower end curved to one side, an outlet passage arranged at the side of and between the ends of said inlet passage and at substantially right angles thereto, and having its end curved following the curved end of said inlet passage; and a clean-out opening at the curved end of each passage, and means to close the same, substantially as described.

2. A curved body having its curve extended through substantially ninety degrees, and provided at one end with two necks standing at substantially right angles to each other; two passages in said curved body, and communicating respectively with said two necks, and at their opposite ends with each other; and a closure for the end of said body opposite said necks, removal of said closure exposing the ends of both passages, substantially as described.

3. A curved body having its curve extended through substantially ninety degrees, and provided at one end with two necks standing at substantially right angles to each other; two passages in said curved body communicating respectively with said two necks; and a cup-shaped closure for that end of the said curved body opposite said necks; said passages communicating with each other through the said closure, substantially as described.

In testimony whereof I have signed my name to this specification in the presence of two subscribing witnesses.

CHARLES J. LENNIHAN.

Witnesses:
FREDERICK L. EMERY,
EMMA J. BENNETT.